United States Patent
Shin et al.

[11] Patent Number: 5,841,631
[45] Date of Patent: Nov. 24, 1998

[54] LATCH BLOCK CONTROL FOR MEDIA BAY MODULE

[75] Inventors: Seong S. Shin, Cupertino; Manpo Kwong, San Jose, both of Calif.; Scot Andrews, Pendelton, Tex.

[73] Assignee: Texas Instruments Incorporated, Dallas, Tex.

[21] Appl. No.: 663,502

[22] Filed: Jun. 14, 1996

[51] Int. Cl.$^6$ ................................ G06F 1/16; H05K 5/02
[52] U.S. Cl. .................... 361/684; 361/683; 361/726
[58] Field of Search ..................... 361/680–686, 361/724–727; 364/708.1; 70/263, 277, 278, 266; G06F 1/16

[56] References Cited

U.S. PATENT DOCUMENTS

| | | | |
|---|---|---|---|
| 4,901,545 | 2/1990 | Bacon et al. | 70/278 |
| 5,122,914 | 6/1992 | Hanson | 360/98.01 |
| 5,157,448 | 10/1992 | Lang | 355/309 |
| 5,311,455 | 5/1994 | Ho | 364/708.1 |
| 5,331,509 | 7/1994 | Kikinis | 361/686 |
| 5,379,184 | 1/1995 | Barraza et al. | 361/685 |
| 5,477,415 | 12/1995 | Mitcham et al. | 361/686 |
| 5,479,341 | 12/1995 | Pihl et al. | 364/184 |
| 5,542,044 | 7/1996 | Pope | 395/186 |
| 5,579,909 | 12/1996 | Deal | 206/317 |
| 5,613,139 | 3/1997 | Brady | 395/800 |

*Primary Examiner*—Lynn D. Feild
*Attorney, Agent, or Firm*—Bret J. Petersen; James C. Kesterson; Richard L. Donaldson

[57] ABSTRACT

This is a locking system for a computing device. The system may comprise: a processor connected to a system bus; an input connected to the processor by the system bus; an output connected to the processor by the system bus; and a module that inserts into the computing device and is connected to the system bus; and a locking mechanism that locks and releases the module to and from the computing device. The locking mechanism may include: a primary lever which engages the module; a manual button which moves the primary lever and disengages the primary lever from the module; a pin that moves from a blocking position in front of the manual button to a non-blocking position clear of the manual button; and a solenoid that controls movement of the pin. Other devices, systems and methods are also disclosed.

9 Claims, 6 Drawing Sheets

LATCH BLOCK CONTROL FOR MEDIA BAY MODULE

CROSS-REFERENCE TO RELATED APPLICATIONS

The following coassigned patent application is hereby incorporated herein by reference:

| Ser. No. | Filing Date | TI Case No. |
|----------|-------------|-------------|
| 08/663,499 | 06/14/96 | TI-22954 |

FIELD OF THE INVENTION

This invention generally relates to devices with a lock controlled by computer software.

BACKGROUND OF THE INVENTION

Although this invention is described in relation to a computer, and specifically a portable computer, it may be implemented into any device that has a lock controlled by a computer software program.

Today, notebook computers may include anything the user may dream of from CD-ROM players to 2 gigabyte hard disk drives, to fully accessoried docking stations. However, in order to reduce the size and weight of the computer, the computer manufacturer must be choose what items the user must have and what items the user can do without in a computer that the size and weight that the user wants.

A method to provide the user the most flexibility and lightest and smallest computer, is to provide a media bay with swapable options. The common options that a media bay may include are floppy drives, hard disk drives, CD-ROM players, magneto-optical drives, and other media. In addition, the operating systems will now allow the user to swap the media bay while the computer is operational. However, this hot-swapable feature is advantageous, as well as very dangerous. Even though the notebook computers may allow the user to remove or insert the media bay module at anytime, it may not be wise to do so. Users may damage the hardware or lose data if the swap is not handled carefully.

SUMMARY OF THE INVENTION

This invention provides a method for the user to change the media bay module when the computer is turned on and not damage the media. In addition, this method will operate with the plug-n-play options of the Microsoft™ Windows™ operating systems. The present invention is controlled by a software program to release the media bay module so that it may be removed and is set each time a media bay module is inserted. However, the present invention will allow ejection of the media bay module whenever the computer is turned off.

The present invention includes a lever that engages the module, a solenoid that controls a pin, and a manual button that moves the lever out of the engaged position. The solenoid moves the pin to block the depression of the manual button when it is on, and moves the pin back when the solenoid is off. Therefore, the module's insertion and removal may be blocked by use of the solenoid. In addition, a software program, or other type of electronic switch, may control turning the solenoid off and on, and thus control the release and insertion of the module.

This is a locking system for a computing device. The system may comprise: a processor connected to a system bus; an input means connected to the processor by the system bus; an output means connected to the processor by the system bus; and a module that inserts into the computing device and is connected to the system bus; and a locking mechanism that locks and releases the module to and from the computing device. The locking mechanism may include: a primary lever which engages the module; a manual button which moves the primary lever and disengages the primary lever from the module; a pin that moves from a blocking position in front of the manual button to a non-blocking position clear of the manual button; and a solenoid that controls movement of the pin. Other devices, systems and methods are also disclosed.

BRIEF DESCRIPTION OF THE DRAWINGS

In the drawings.

Corresponding numerals and symbols in the different figures refer to corresponding parts unless otherwise indicated.

DETAILED DESCRIPTION OF PREFERRED EMBODIMENTS

Figure 7:
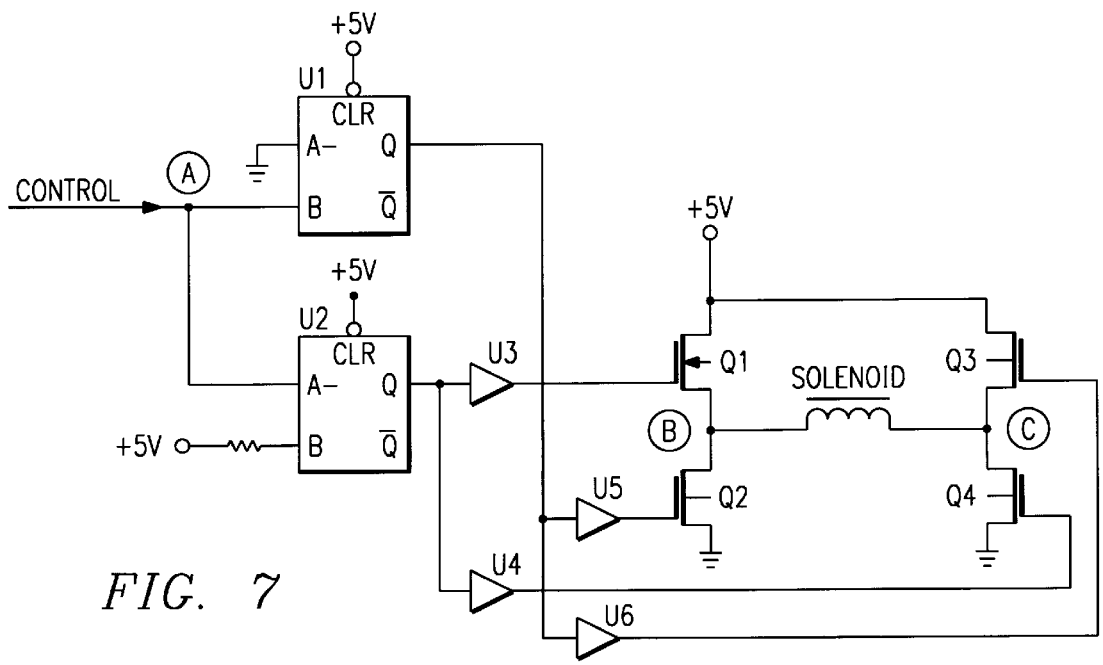
FIG. 7 is a circuit diagram of the solenoid circuit used to control the media bay lock system.
Figure 5:
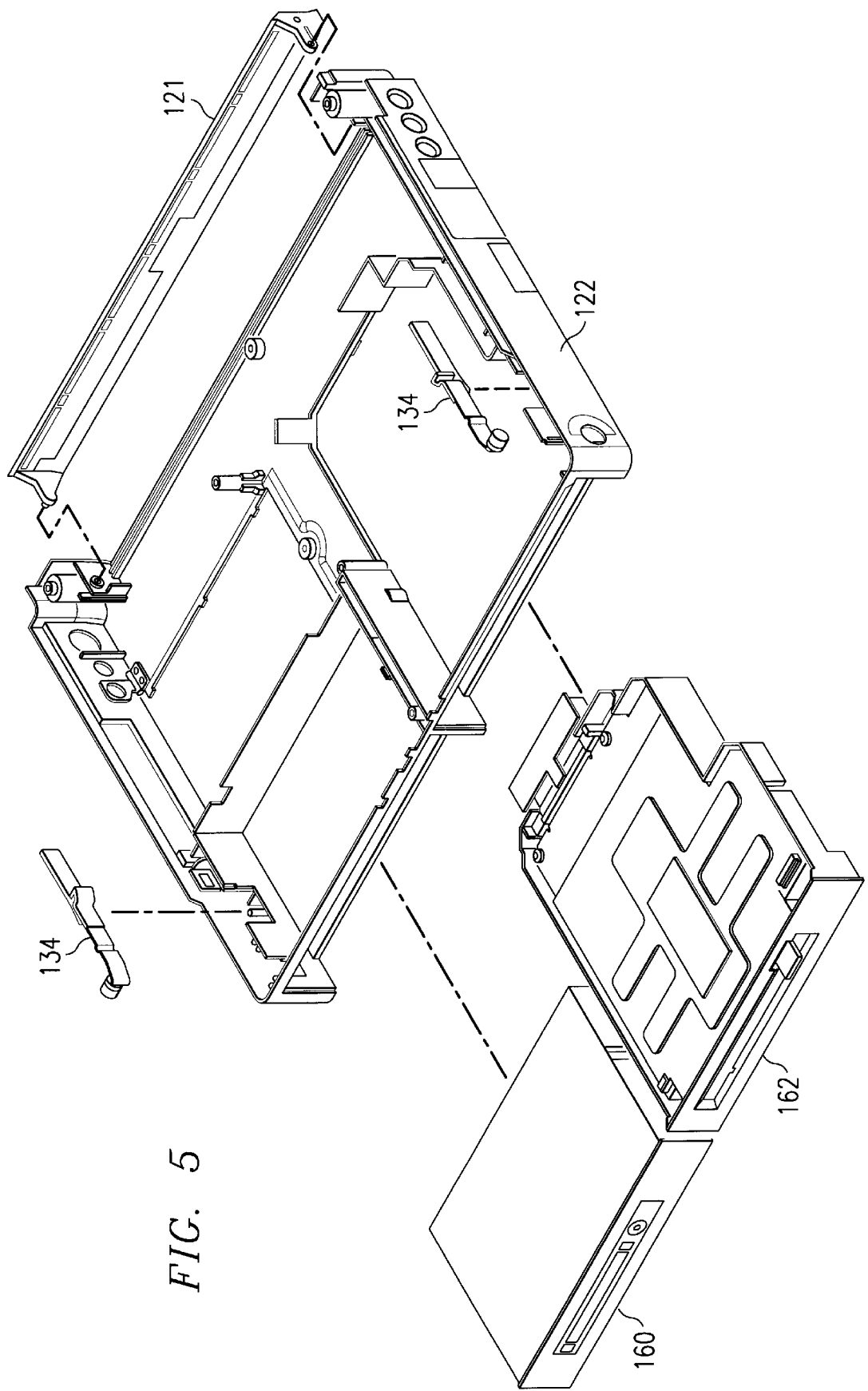
FIG. 5 is a close-up of the base of the portable computer.
Figure 6:
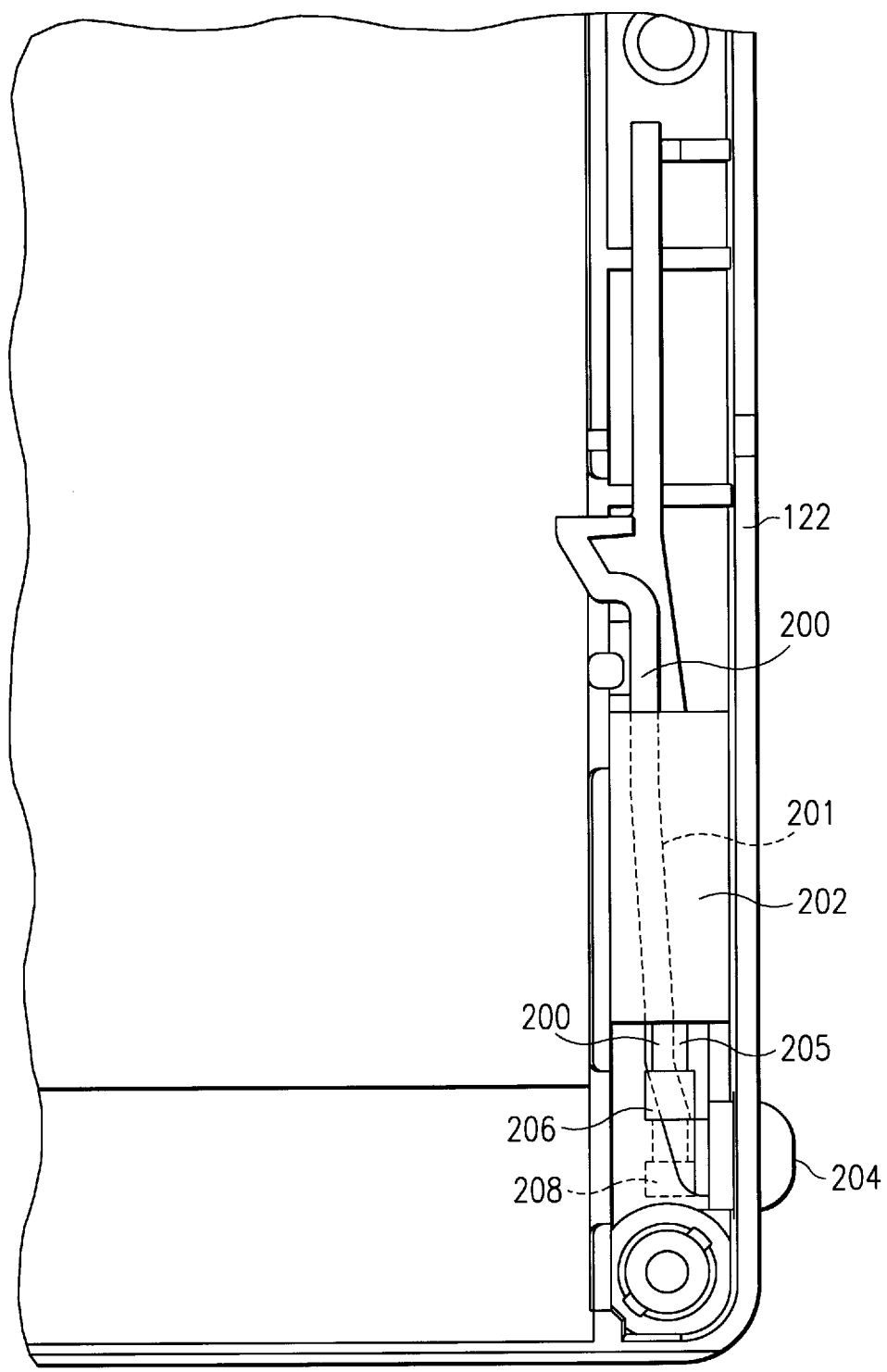
FIG. 6 is a close-up of the lock system for the media bay.

FIGS. 1–4 illustrate a portable personnel computer which the present invention could be implemented on. FIGS. 5–7 illustrate details of the present invention.

Figure 1:
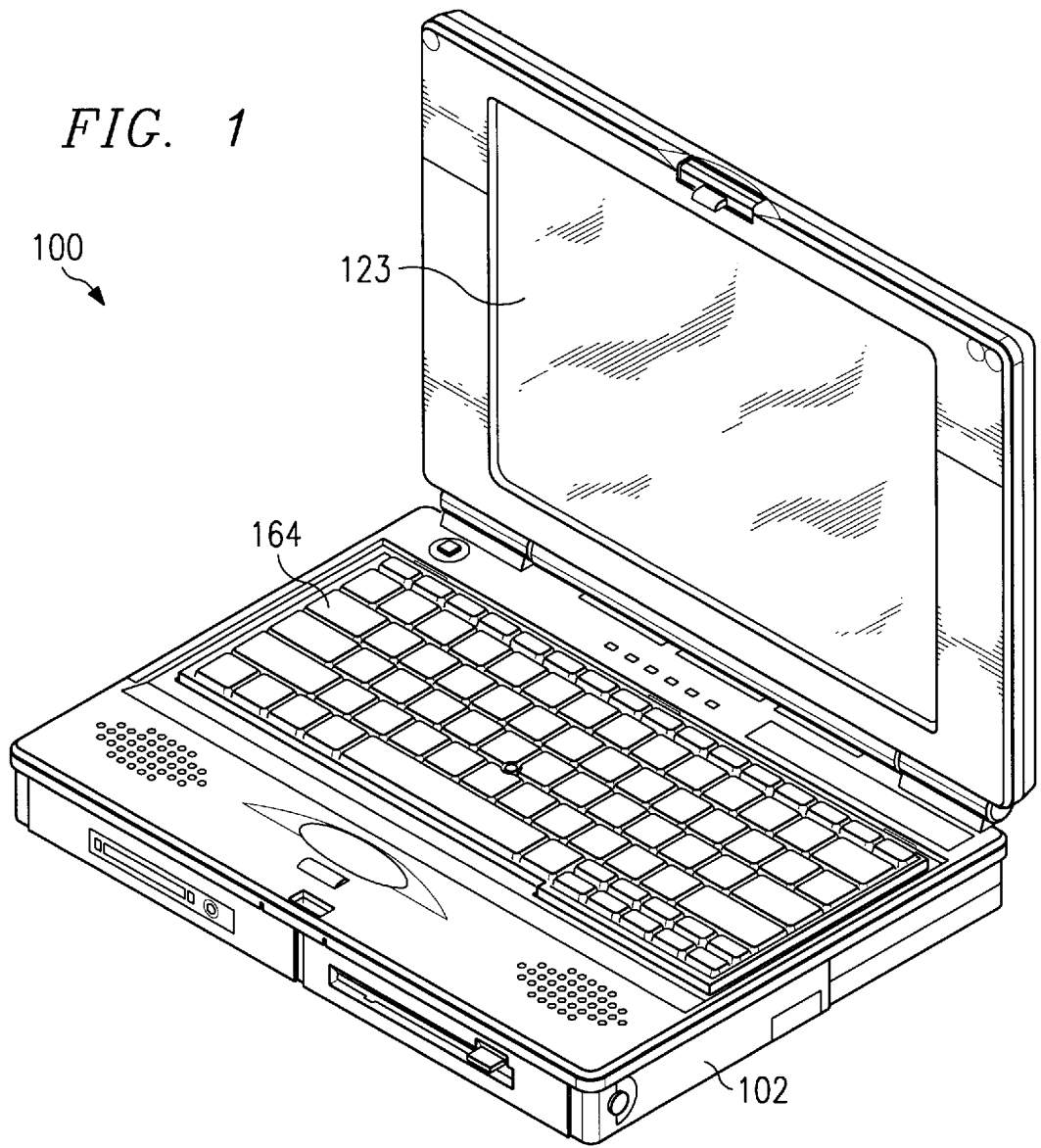
FIG. 1 is an isometric view of a portable computer.

FIG. 1 illustrates a portable personal computer 100 having a primary display 123, a base unit 102 and a keyboard 164. The present invention is ideally suited for the portable computer 100. The alternate display could include a clear window made of plastic or glass directly above the PCMCIA cards. In addition, the display could include a sliding privacy window, to close the clear window for privacy purposes. However, the alternate display could include an opaque window that slides back to leave an opening to see the PCMCIA card display. Moreover, one possible configuration for the alternate display would display messages in one or two lines, and scroll as needed. However, although FIG. 1 illustrates one embodiment, other embodiments will be discussed later.

Figure 2:
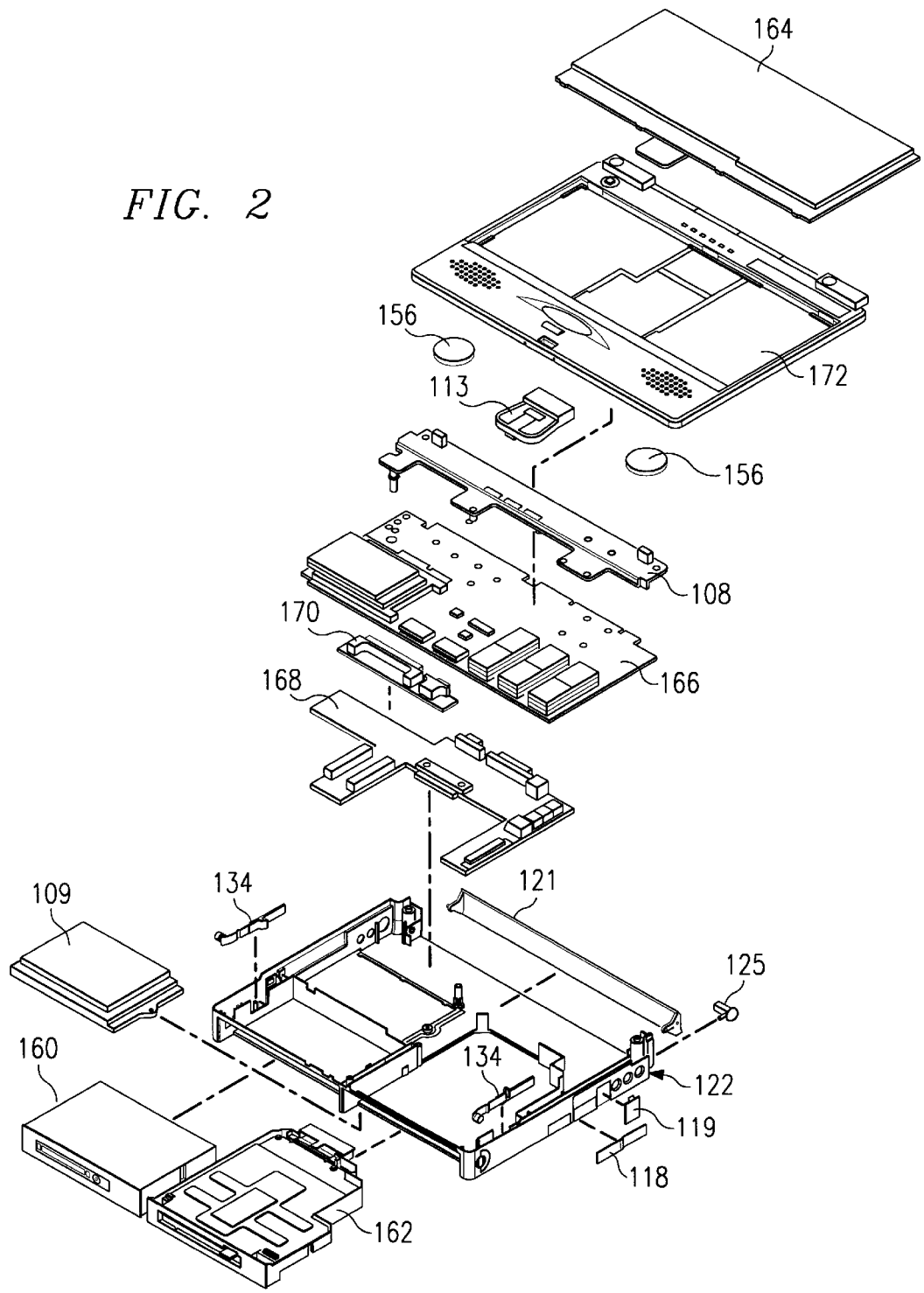
FIG. 2 is an exploded view of the base of the portable computer of FIG. 1.

FIG. 2 illustrates an exploded view of the base unit 102 of FIG. 1. Keyboard 164 is attached to top cover 172. The speaker assemblies 156 and the pick button assembly 113 both attach to the top cover 172. Moreover, the top printed wiring board 166 and the bottom printed wiring board 168 are attached to the heatplate and printed wiring board assembly 108. The bus/VGA printed wiring board 170 also attaches to the bottom printed wiring board 168. The assembly 108 and printed wiring boards 168, 170 and 166 fit into the base assembly 122.

The base assembly 122 has a connector door 121 that exposes the connectors for the user's access. The connector door 121 is operated by the door release button 125. The base assembly 122 also has a modem door 118, hard drive assembly 109 and media release latches 134. The media release latches 134 release and secure the battery pack 160 and media bay 162.

Figure 3:
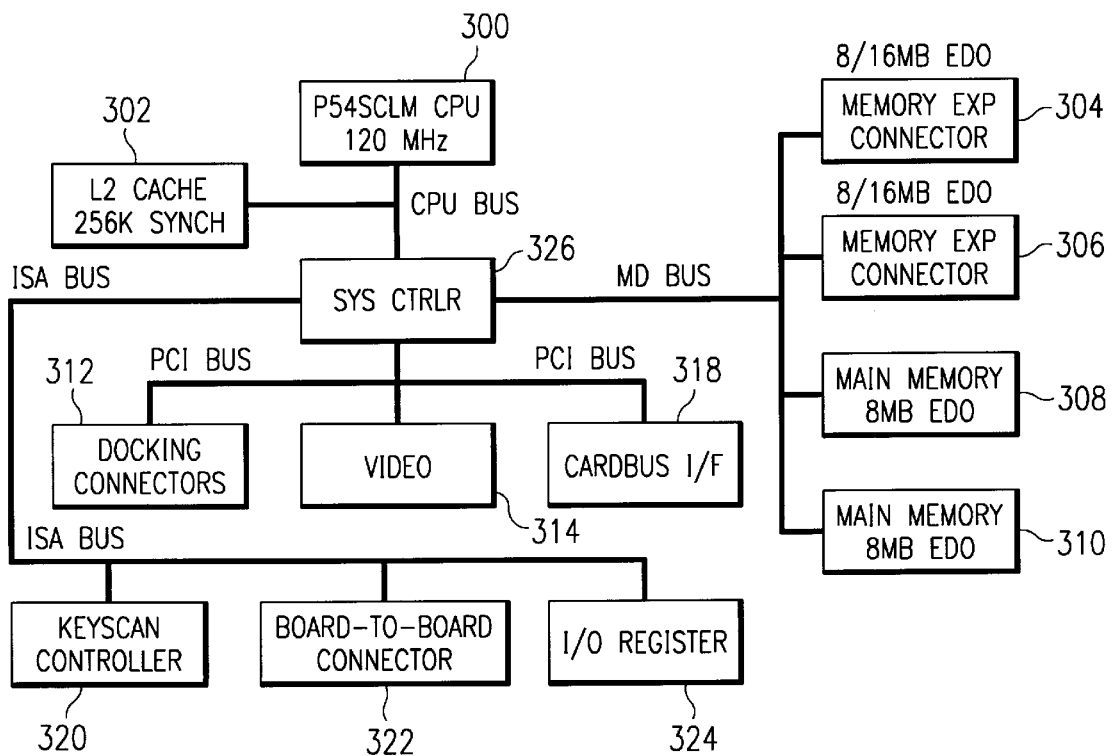
FIG. 3 is a block diagram of the electronic architecture of the portable computer of FIG. 1.

FIG. 3 is a block diagram of the top printed wiring board 166 of portable computer 100 (shown in FIG. 2). Portable computer 100 is a color portable notebook computer based upon the Intel™ Pentium™ microprocessor 300. Operating speed of the Pentium™ is 120 Mhz internal to the processor, but with a 60 Mhz external bus speed. A 60 Mhz oscillator is supplied to the ACC Microelectronics 2056 core logic chip (not shown in FIG. 3) which in turn uses this to supply the microprocessor. This 60 Mhz CPU clock is multiplied by a phase locked loop internal to the processor to achieve the 120 Mhz CPU speed. The processor 300 contains 16 KB of internal cache and 256 KB of external cache 302 on the logic board.

The 60 Mhz bus of the CPU is connected to a VL to PCI bridge chip 326 from ACC microelectronics to generate the PCI bus, the ISA bus and the MD bus. The bridge chip takes a 33.333 Mhz oscillator to make the PCI bus clock. The primary video controller 314 and alternate video controller 316 are driven from the PCI bus. In addition, both, a docking options connector 312 and a cardbus I/F 318 are connected to the PCI bus. The cardbus I/F 318 connects a PCMCIA card system which allows two PCMCIA cards to be connected to the PCI bus. These slots may be used with third party boards to provide various expansion options.

The primary video controller 314 has a 14.318 Mhz oscillator input which it uses internally to synthesize the higher video frequencies necessary to drive an internal 10.4" TFT panel or external CRT monitors. When running in VGA or Super VGA resolution modes, the TFT panel may be operated at the same time as the external analog monitor. For XVGA resolutions only the external CRT may be used. In addition, the PCMCIA card system has a zoom video connection to the primary video controller.

Portable computer 100 contains 16 Megabytes of standard memory 308, 310 which may be increased by the user up to 48 Megabytes by installing optional expansion memory boards 304, 306. The first memory expansion board can be obtained with either 8 or 16 Megabytes of memory. With the first expansion board installed, another 8 or 16 Megabytes of memory may be attached to make the maximum amount.

Operation input to portable computer 100 is made through the keyboard and an internal pointing device imbedded in the keyboard. Both types of input feed into the keyscan controller 320 which is connected by the ISA bus. In addition, I/O register 324 is connected through the ISA bus. Moreover, a board-to-board connector 322 connects the top printed wiring board to the bottom printed wiring board.

Figure 4:
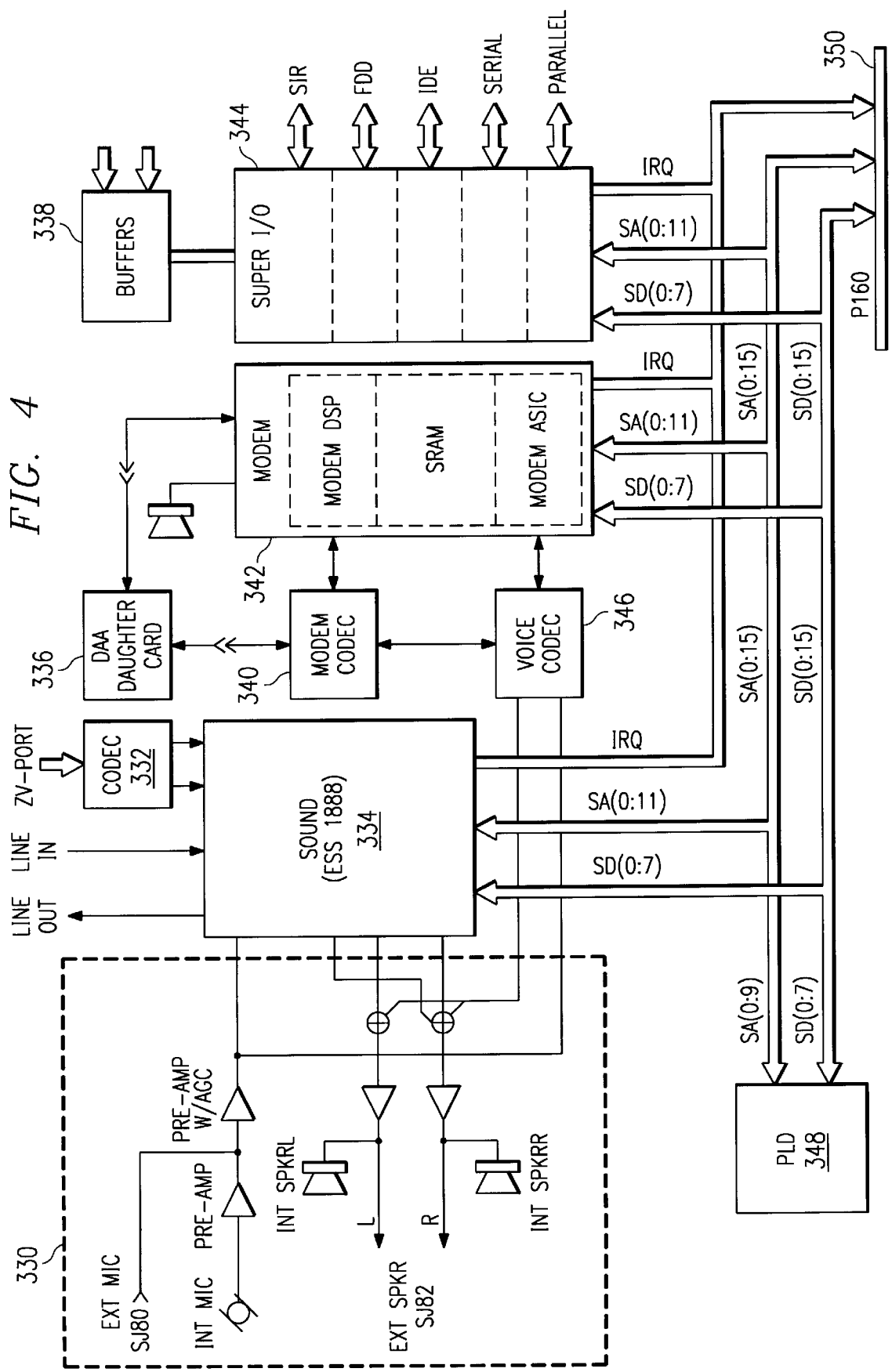
FIG. 4 is another block diagram of the electronic architecture of the portable computer of FIG. 1.

FIG. 4 is a block diagram of the bottom printed wiring board 168 of the portable computer 100 (shown in FIG. 2). The battery system (not shown) of portable computer 100 is Lithium Ion and has internal controllers which monitor the capacity of the battery. These controllers use a 4.19 Mhz crystal internal to the battery.

Portable computer 100 also has an internal sound chip 334 which can be used to generate or record music and/or sound effects. The sound chip 334 is feed by internal speakers, an external speaker connection, and internal and external microphones. In addition, a zoom video port feeds into a codec chip 332 which is connected to the sound chip set 334. The codec chip 332 is a digital to analog converter.

The modem chip set 342 is connected to a DAA daughter card 336, a modem codec 340, and a voice codec 346 which also connects to the microphones and speakers. The DAA daughter card 336 is an adapter that allows the modem 342 to adapt to many different types of telecommunications around the world without modification to the modem 342 itself.

The super I/O (input/output) chip set 344 is connected to a set of buffers 338, a floppy disk drive, an IDE hard disk drive, and serial and parallel ports. In addition, a second serial port is connected to a Serial Infrared (SIR) device. This SIR device has an interface chip which uses a 3.6864 Mhz oscillator. The SIR port can be used to communicate serial data to other computers or peripherals equipped to either receive or transmit SIR data.

The programmable logic device (PLD) 348 controls many proprietary functions of the computer. For example, the PLD 348 controls the IDE interface to the media bay module which may include a CD-ROM player, an additional hard disk or other peripherals devices. In addition, if the media bay module is a floppy disk drive, the PLD 348 will route the communications to the super I/O chip 344.

The P160 350 is a board-to-board connector that connects the bottom printed wiring board to the top printed wiring board.

The sound chip set 334, the modem chip set 342, and the super I/O chip set 344 are all connected to the interrupt (IRQ), the SA (ISA address bus), and the SD (ISA data bus) lines.

FIG. 5 depicts more detail of the media bay module 162, the release mechanism 134 and the computer base 122. However, the release mechanism in this figure is not the same mechanism that is illustrated in FIGS. 6 and 7. In addition, the connector door 121 and the battery pack 160 are also shown.

FIG. 6 shows the release mechanism of the present invention. The release mechanism includes a manual button 204 that moves lever 200 on pivot 201; the extended end of lever 200 remote from button 204 latches the media bay module inside the computer. This lever 200 engages the media bay module and prevents it from moving. The user must press the button 204 in order to remove or insert the module. The mechanism also includes a solenoid (latch type) 202 which is controlled by software and can block the movement of button 204 as shown by the broken lines in FIG. 6 and described in the following paragraphs. An example of the software program that controls the solenoid is included within the patent application TI-22954 that is incorporated by reference.

There is no SMI generated from this mechanism. The solenoid 202 should be in the off position when the computer is turned off. Software icons are used to lock or unlock the media bay module. The open icon is used to unlock the solenoid and the close icon is used to lock the solenoid. This software control method combined with the latched type solenoid is the most flexible way to control the removal or insertion of media bay module in today's notebook computer.

The solenoid 202 combines an electromagnet with a spring and permanent magnet to allow motion between two stable positions. The blocking solenoid 202 is placed into the base of the computer 122 next to the manual media bay button 204. The solenoid 202 positions and holds a small metal pin 205 in the non-blocking position 206 or in blocking position 208. While the solenoid pin 205 is held in the non-blocking position 206, the manual button 204 can be depressed and moves the lever 200 outward, disengaging the module. The lever pivots around a pin 201 and is at rest in the engaged position because of a torsional spring around pin 201. Likewise, while the solenoid pin 205 is held in the blocking position 208, the manual button 204 is partially blocked and cannot move lever 200. Thus, this mechanism gives the software program the capability to control user insertion and removal of the media bay module.

FIG. 7 is a circuit diagram of the solenoid that is controlled by the computer software program. The solenoid circuit includes four MOSFETSs, four MOSFET drivers and a pair of monostable multivibrators. When the software sends a logic high level (+5 volts) signal to A, U1 will generate a positive pulse to U5 and U6. U5 and U6 then turn on Q2 and Q3, which causes current to flow from point C to B of the solenoid and latch the solenoid in the closed position (the media bay module is locked.). When software sends a logic low level (ground) signal to point A, U2 will generate a positive pulse to U3 and U4. U3 and U4 then turn on Q1 and Q4, which causes current to flow from point B to C of the solenoid and latch the solenoid in the open position (the media bay module is unlocked.).

While this invention has been described with reference to illustrative embodiments, this description is not intended to be construed in a limiting sense. In addition, various modifications and combinations of the illustrative embodiments, as well as other embodiments of the invention, will be apparent to persons skilled in the art upon reference to the description. Words of inclusion are to be interpreted as nonexhaustive in considering the scope of the invention. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A computing system comprising:
   a processor controlled by software and connected to a system bus;
   a module that inserts into said computing system and is connected to said system bus;
   a mechanism that locks and releases said module to and from said computing system, wherein said mechanism further includes:
   a primary lever which engages said module;
   a manual button which moves said primary lever and disengages said primary lever from said module;
   a pin that moves from a blocking position in front of said manual button to a non-blocking position clear of said manual button; and
   a solenoid that controls movement of said pin; and
   means for controlling said mechanism responsive to said processor under software control to move said mechanism to an un-locked position when directed by software and when said system is turned off.

2. The system of claim 1, wherein said module is a battery system.

3. The system of claim 1, wherein said module is a media bay module.

4. The system of claim 3, wherein said media bay module is a CD-ROM.

5. The system of claim 3, wherein said media bay module is a hard disk drive.

6. The system of claim 3, wherein said media bay module is a floppy disk drive.

7. The system of claim 3, wherein said media bay module is a magneto-optical drive.

8. A computing system comprising:
   a processor controlled by software and connected to a system bus;
   an input means connected to said processor by said system bus;
   an output means connected to said processor by said system bus; and
   a module that inserts into said computing device and is connected to said system bus; and
   a mechanism that locks and releases said module to and from said computing device, and wherein said mechanism includes:
   a primary lever that engages said module when said module is inserted into said computing device;
   a manual button which moves said primary lever and disengages said primary lever from said module and;
   blocking means under software control for blocking or unblocking actuation of said manual button.

9. The system of claim 8, wherein said blocking means is also actuated when said system is turned off.

* * * * *